(12) United States Patent
Caillot

(10) Patent No.: US 10,035,496 B2
(45) Date of Patent: Jul. 31, 2018

(54) WIPING DEVICE FOR A MOTOR VEHICLE GLASS SURFACE

(75) Inventor: Gérald Caillot, Cernay la Ville (FR)

(73) Assignee: Valeo Systèmes d'Essuyage, Le Mesnil Saint Denis (FR)

(*) Notice: Subject to any disclaimer, the term of this patent is extended or adjusted under 35 U.S.C. 154(b) by 333 days.

(21) Appl. No.: 13/469,546

(22) Filed: May 11, 2012

(65) Prior Publication Data
US 2013/0036569 A1 Feb. 14, 2013

(30) Foreign Application Priority Data

May 12, 2011 (FR) .................................. 11 54100

(51) Int. Cl.
| | | |
|---|---|---|
| *B60S 1/46* | (2006.01) | |
| *B60S 1/52* | (2006.01) | |
| *B60S 1/32* | (2006.01) | |
| *B60S 1/38* | (2006.01) | |

(52) U.S. Cl.
CPC ............... *B60S 1/522* (2013.01); *B60S 1/32* (2013.01); *B60S 1/3801* (2013.01); *B60S 1/52* (2013.01)

(58) Field of Classification Search
CPC .................................. B60S 1/52; B60S 1/522
USPC ........... 15/250.04, 250.03, 250.02; 239/84.1, 239/84.2
See application file for complete search history.

(56) References Cited

U.S. PATENT DOCUMENTS

| | | | | |
|---|---|---|---|---|
| 3,428,992 A | * | 2/1969 | Di Giorgio ................ | 15/250.04 |
| 3,757,379 A | * | 9/1973 | Benson ...................... | 15/250.04 |
| 3,790,083 A | * | 2/1974 | Redifer ...................... | 239/284.1 |
| 3,854,161 A | * | 12/1974 | Benson ...................... | 15/250.04 |
| 3,887,956 A | * | 6/1975 | Wind .......................... | 15/250.04 |
| 3,940,068 A | * | 2/1976 | Mohnach et al. .......... | 239/284.1 |
| 4,517,704 A | * | 5/1985 | Benson ...................... | 15/250.04 |
| 4,782,547 A | * | 11/1988 | Mohnach .................... | 15/250.04 |
| 4,922,570 A | * | 5/1990 | Hirohama et al. .......... | 15/250.02 |
| 4,959,882 A | * | 10/1990 | Henderson et al. ........ | 15/250.04 |
| 5,065,471 A | * | 11/1991 | Laplante .................... | 15/250.04 |
| 5,239,726 A | * | 8/1993 | Bianco ....................... | 15/250.4 |
| 5,291,627 A | * | 3/1994 | Liou .......................... | 15/250.04 |

(Continued)

FOREIGN PATENT DOCUMENTS

| | | |
|---|---|---|
| DE | 2942086 A1 | 4/1981 |
| DE | 3744237 A1 | 7/1989 |

(Continued)

OTHER PUBLICATIONS

French Search Report in corresponding French application No. 1154100 dated Dec. 7, 2011 (2 pages).

(Continued)

*Primary Examiner* — Michael Jennings
(74) *Attorney, Agent, or Firm* — Osha Liang LLP

(57) ABSTRACT

The present invention concerns a motor vehicle glazed surface wiper device including an actuator arm (1; 10; 60) adapted to be connected to a windshield wiper (2), a liquid feed pipe (3) carried by the actuator arm (1) and at least one sprayer (4; 4'; 4"; 40; 50) having at least one spray orifice (45) and a connector (5) adapted to be inserted into the liquid feed pipe (3), characterized in that said sprayer (4; 4'; 4"; 40; 50) is fastened to the actuator arm (1; 10; 60).

Figure 1:
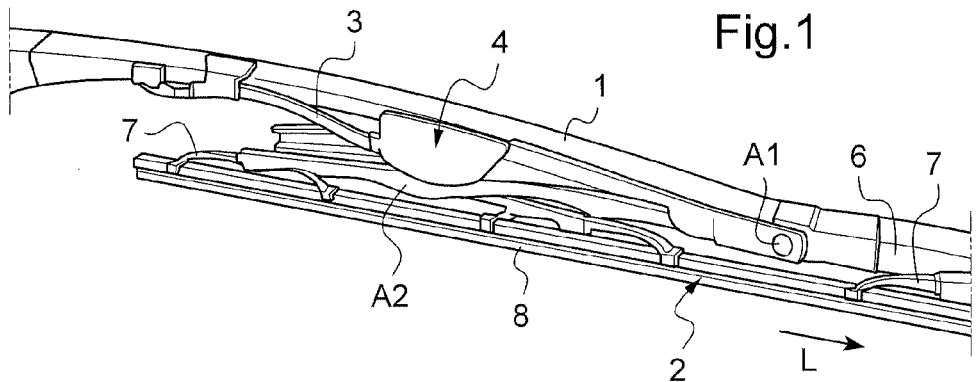

The present invention also concerns a mechanical connector for motor vehicle windshield wipers and a wiper device.

13 Claims, 5 Drawing Sheets

(56) References Cited

U.S. PATENT DOCUMENTS

| | | | | | |
|---|---|---|---|---|---|
| 5,842,251 | A | * | 12/1998 | LeFrançois et al. | 15/250.04 |
| 5,946,763 | A | * | 9/1999 | Egner-Walter et al. | 15/250.02 |
| 6,094,772 | A | * | 8/2000 | West | 15/250.04 |
| 6,286,174 | B1 | * | 9/2001 | Zimmer | 15/250.04 |
| 6,934,992 | B2 | * | 8/2005 | Sato | 15/250.04 |
| 7,836,541 | B2 | * | 11/2010 | Harita et al. | 15/250.04 |
| 8,069,527 | B2 | * | 12/2011 | Harita | 15/250.04 |
| 8,225,455 | B1 | * | 7/2012 | Blus et al. | 15/250.04 |
| 2008/0155776 | A1 | * | 7/2008 | Harita | 15/250.04 |

FOREIGN PATENT DOCUMENTS

| | | | | | |
|---|---|---|---|---|---|
| DE | 19829759 | A1 | | 1/2000 | |
| DE | 10031417 | A1 | | 1/2002 | |
| EP | 0845395 | A1 | | 6/1998 | |
| FR | 2747975 | A1 | | 10/1997 | |
| FR | 2758781 | A1 | * | 7/1998 | B60S 1/52 |
| FR | 2783225 | A1 | | 3/2000 | |
| WO | WO 9108933 | A1 | * | 6/1991 | B60S 1/48 |
| WO | 0015479 | A1 | | 3/2000 | |

OTHER PUBLICATIONS

German Search Report in corresponding German Application No. 102012104064.8 dated Sep. 28, 2012 (2 pages).

\* cited by examiner

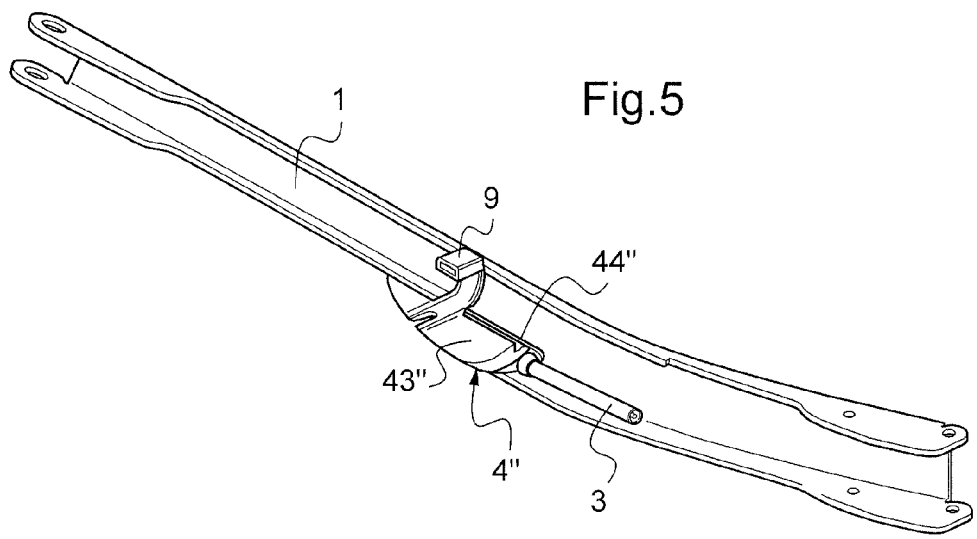
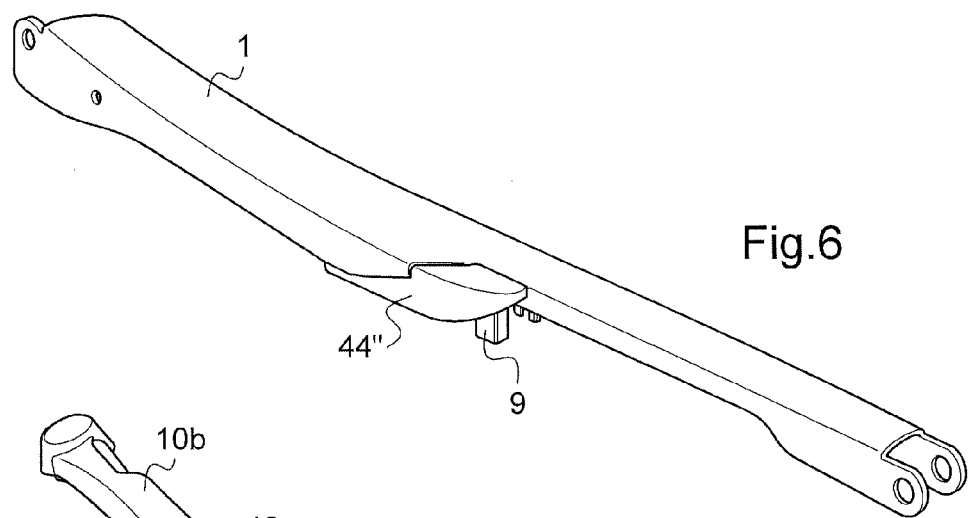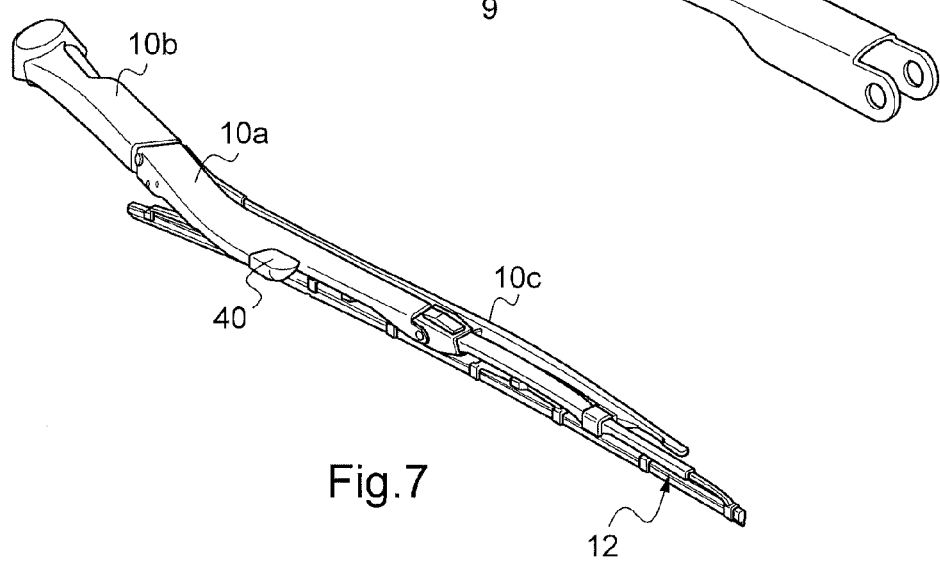

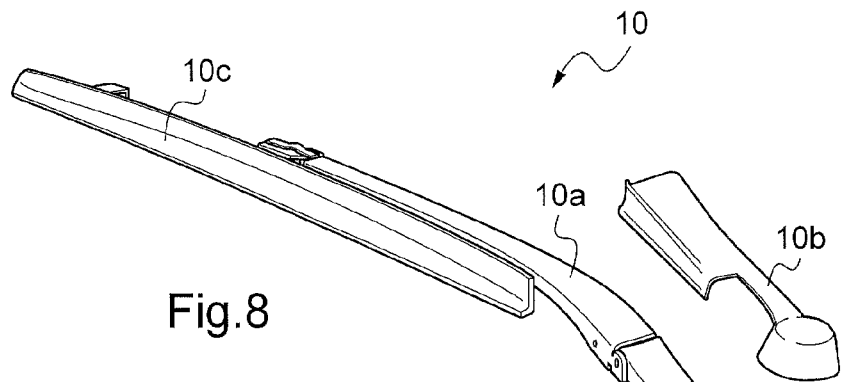
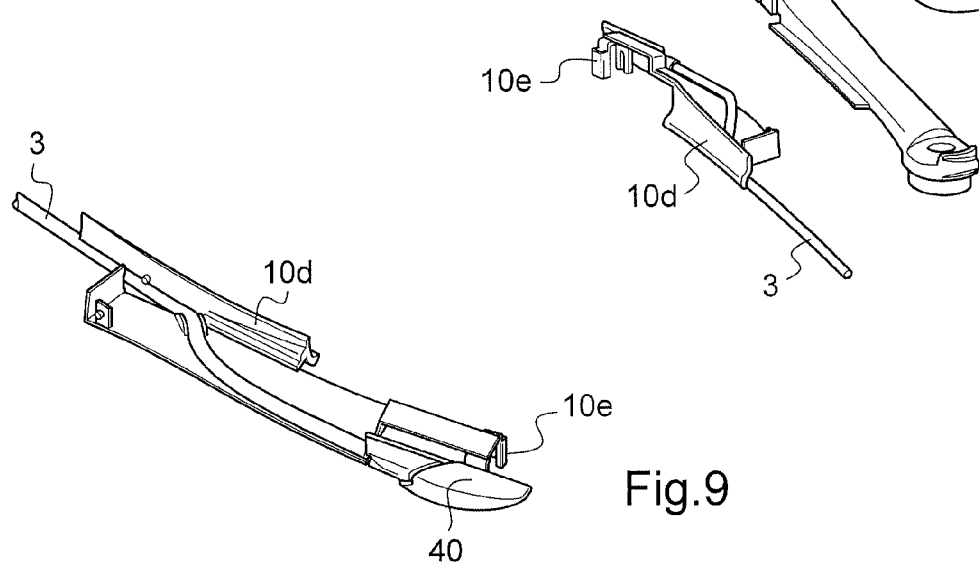
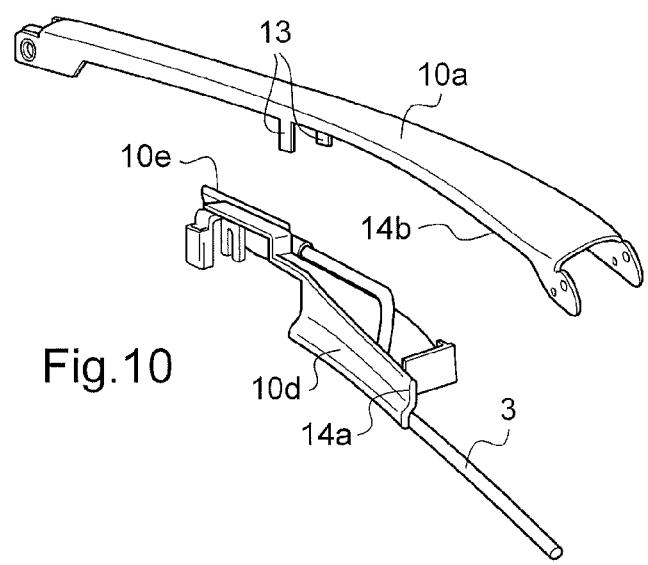

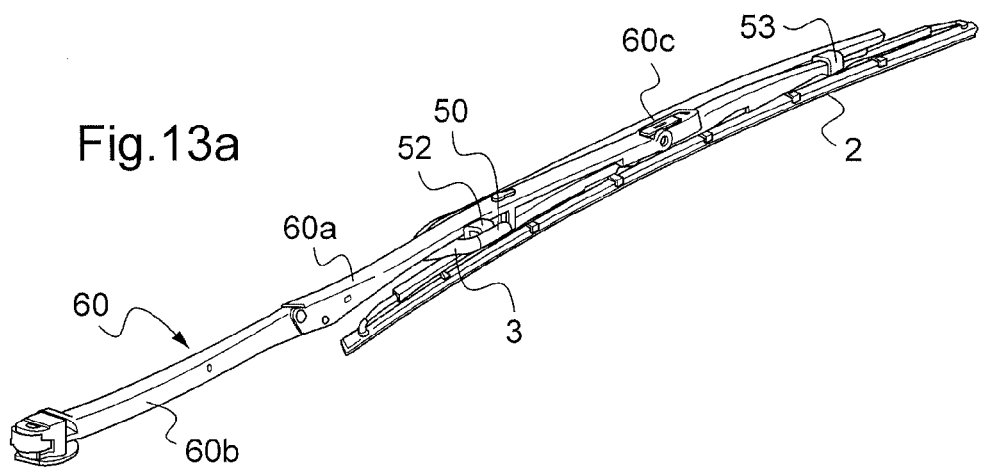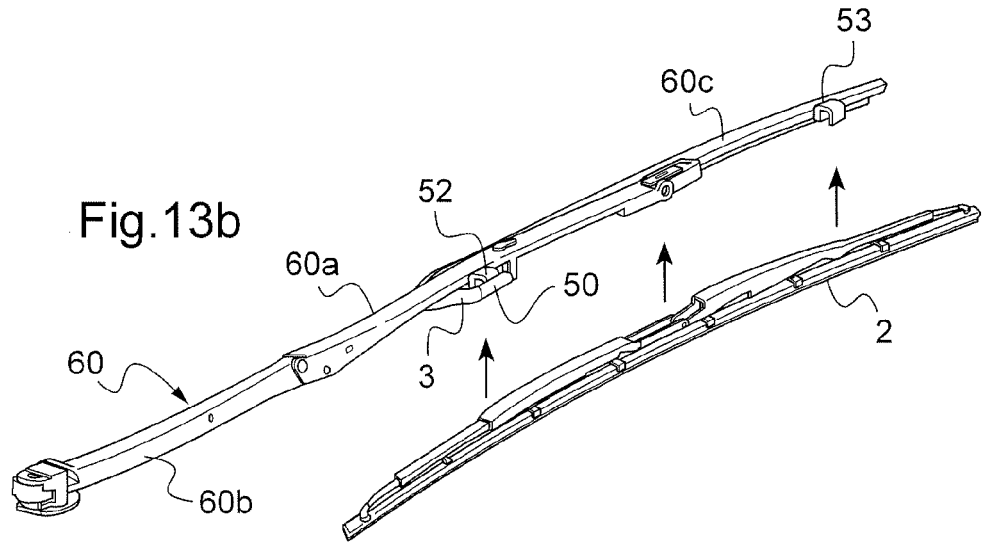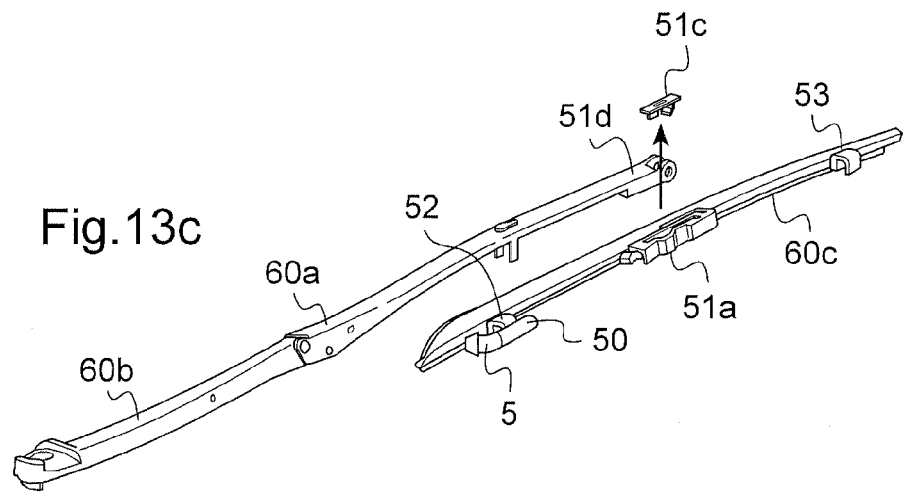

WIPING DEVICE FOR A MOTOR VEHICLE GLASS SURFACE

The present invention concerns a wiper device for a glazed surface of a motor vehicle including an actuator arm adapted to be connected to a windshield wiper, wherein the actuator arm carries a liquid feed pipe. The wiper device further includes at least one sprayer having at least one spray orifice and a connector adapted to be inserted into the windshield washer liquid feed pipe.

Fitting a sprayer device onto a windshield wiper is known in the art and enables the glass to be washed more efficiently by moving the sprayer nozzles as close as possible to the glass. This prevents the jet of liquid from being deflected by the air flowing along the glass when the vehicle is moving.

The present invention proposes an improved wiper device.

To this end, the present invention consists in a wiper device for a glazed surface of a motor vehicle including an actuator arm adapted to be connected to a windshield wiper, a liquid feed pipe carried by the actuator arm and at least one sprayer having at least one spray orifice and a connector adapted to be inserted into the liquid feed pipe, characterized in that said sprayer is fastened to the actuator arm.

According to one or more features of the wiper device, separately or in combination:
  the sprayer is fastened to a guide clip, the guide clip being fastened to a longitudinal bracket of the actuator arm,
  the sprayer includes a casing fastened to one end of a lateral wing of the guide clip,
  the sprayer and the guide clip including a moulded plastic material body produced in two parts that are joined together,
  the sprayer includes a casing formed by a base and a complementary closure cap, the closure cap carrying the connector and the base carrying the guide clip,
  the sprayer includes a casing formed by a base and a complementary closing cap, the base carrying the connector and the guide clip,
  the sprayer is fastened to a guide clip, the sprayer including a casing formed by a base and a complementary closure cap, the base carrying the connector and the guide clip and the closure cap being fastened to the actuator arm,
  the actuator arm includes a longitudinal bracket and a casing embellisher and the sprayer is fastened to the casing embellisher, the casing embellisher being fastened to the longitudinal bracket,
  the casing embellisher and the longitudinal bracket include complementary elastic nesting type fixing means,
  the sprayer is fastened to a guide clip of the casing embellisher and the guide clip and the casing embellisher have shapes cooperating with complementary shapes of the longitudinal bracket,
  the sprayer is fastened to a support mount of the actuator arm, the support mount being fastened to a longitudinal bracket of the actuator arm,
  the sprayer is fixed to a guide clip of the support mount.

When the driver operates the washer pump to wash a glazed surface of their vehicle, windshield washer liquid is fed into the liquid feed pipe and then into the sprayer via the connector and leaves it via the spray orifice to be sprayed onto the glazed surface of the vehicle. The sprayer fastened to the actuator arm therefore follows the alternating wiping movement of the wipers. The wiper device thus enables efficient washing of the glass by moving the spray orifices as close as possible to the glazed surface.

Moreover, the sprayer fastened to the actuator arm remains in place thereon when changing the windshield wiper, which greatly reduces the cost of the windshield wiper compared to a wiper including a built-in sprayer device.

Figure 2:
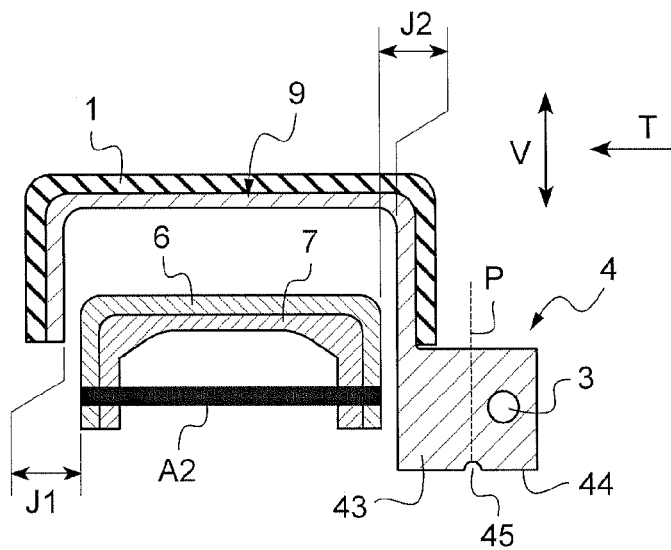
Figure 3:
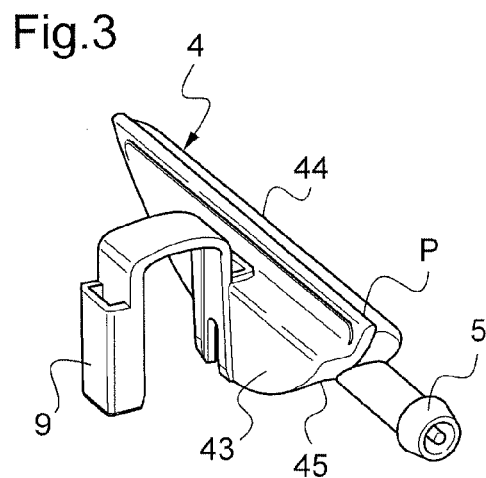
Figure 4:
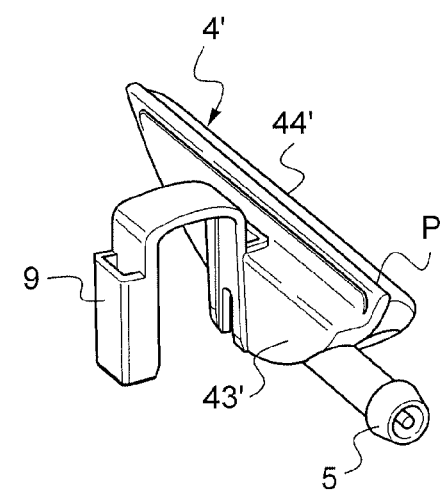
Figure 11:
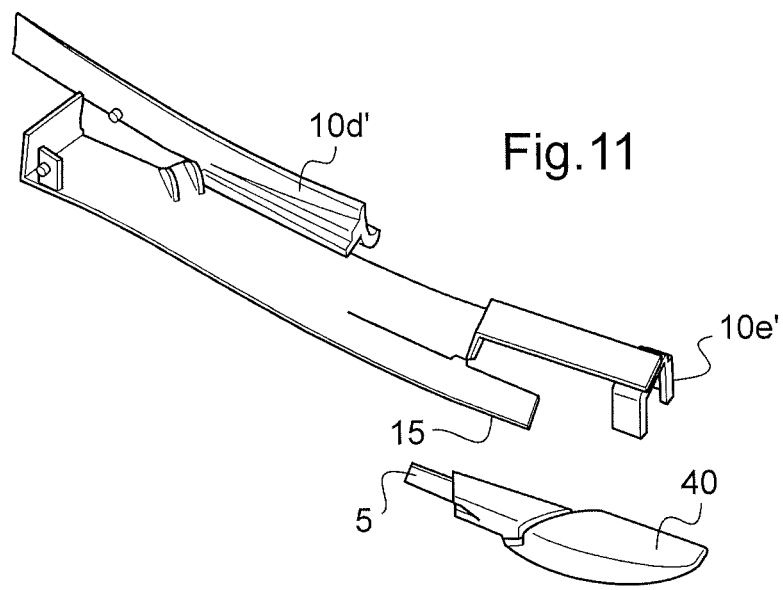
Figure 12:
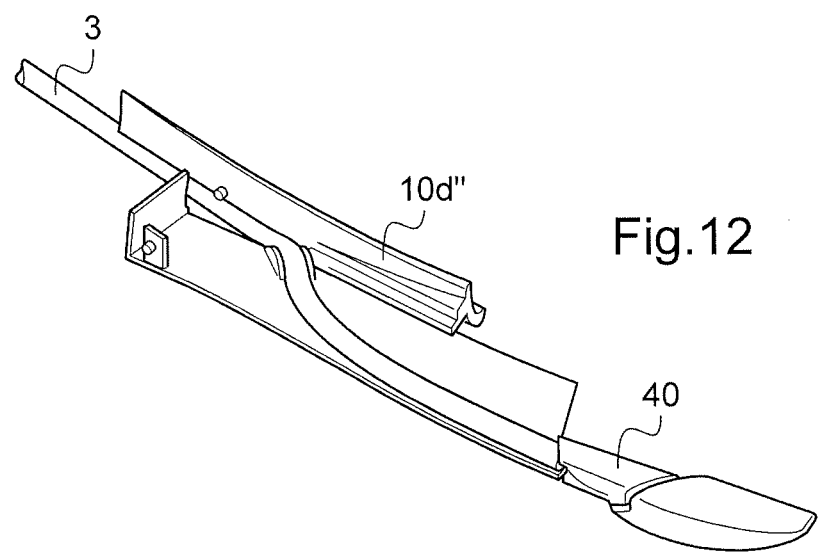

Other features and advantages of the invention will emerge from the following description given by way of nonlimiting example with reference to the appended drawings in which:

FIG. 1 is a partial perspective view of a wiper device connected to a windshield wiper of a first embodiment, FIG. 2 is a diagrammatic sectional view of some of the assembled elements of the FIG. 1 wiper device, FIG. 3 is a perspective view of the sprayer and the guide clip of the FIG. 1 wiper device, turned through 180°, FIG. 4 is a view similar to FIG. 3 of a different embodiment of the sprayer and the guide clip, FIG. 5 is a perspective view of elements of another embodiment of a wiper device, FIG. 6 is a view of the FIG. 5 wiper device turned through 180°, FIG. 7 is a perspective view of a second embodiment of the wiper device connected to a windshield wiper, FIG. 8 is a view of the actuator arm and the sprayer of the FIG. 7 wiper device, disassembled and turned through 180°, FIG. 9 shows in detail the casing embellisher fastened to the sprayer connected to the liquid feed pipe of the FIG. 8 wiper device, FIG. 10 shows in detail the longitudinal clip of the actuator arm in vertical alignment with the casing embellisher of the FIG. 9 wiper device, FIG. 11 shows a first variant of the casing embellisher, the casing embellisher and the sprayer being disassembled, FIG. 12 shows a second embodiment of a casing embellisher fastened to a sprayer connected to a liquid feed pipe, FIG. 13a is a perspective view of a third embodiment of a wiper device connected to a windshield wiper in the assembled state, FIG. 13b shows the FIG. 13a actuator arm disassembled from the wiper, and FIG. 13c shows the FIG. 13b actuator arm separated from a supporting mount carrying a sprayer.

In these figures, identical elements carry the same reference numbers.

A first embodiment of a wiper device is shown in FIGS. 1 to 3. This first embodiment, although described in the context of the wiper device mounted on a standard windshield wiper with a wiper arm is equally suitable for mounting the device on a flat windshield wiper having a flexible structure (known as a "flat blade").

The wiper device includes an actuator arm 1 connected to a windshield wiper 2, a liquid feed pipe 3 carried by the actuator arm 1, and at least one sprayer 4. The sprayer 4 has a plurality of spray orifices and a connector 5 designed to be inserted into the liquid feed pipe 3. To be more specific, the connector 5 is inserted into a flow passage of the liquid feed pipe 3. At the other end, the liquid feed pipe 3 is connected to a windshield washer liquid bottle of the motor vehicle. A pump is also provided to pump the windshield washer liquid into the pipe 3.

The actuator arm 1 includes a casing in the form of a longitudinal bracket (see the longitudinal axis L in FIG. 1) which in section (FIG. 2) has an inverted U-shape formed by a back at the top which connects two longitudinal wings.

In this first embodiment, the windshield wiper 2 connected to the washer device includes an articulated structure including a main bracket 6 articulated at A1 by its central portion to the actuator arm 1 and that carries at its two longitudinal ends secondary wiper arms 7 each articulated to the main bracket 6 about a transverse axis A2. The main bracket 6 and the secondary wiper arms 7 have a U-shape, like the longitudinal bracket of the actuator arm 1.

The articulated structure carries a wiper squeegee 8 that it is designed to press against the glass because of the effect of a pressure force imposed by the actuator arm 1. Thus the actuator arm 1 may drive the windshield wiper 2 so that it sweeps to and fro across the glazed surface.

In known manner, the central portion of the secondary wiper arm 7 is received between the lateral wings of the main bracket 6, which is itself received between the lateral wings of the longitudinal bracket of the actuator arm 1.

A guide clip 9 is disposed between the longitudinal bracket of the actuator arm 1 and the main bracket 6 of the windshield wiper 2. The guide clip 9 is fastened to the longitudinal bracket of the actuator arm 1. It is for example clipped into the longitudinal bracket of the actuator arm 1. To this end, the longitudinal bracket may have transverse clipping lugs or orifices cooperating with the U-shape of the guide clip 9 to nest it.

Transverse clearances J1, J2 (see transverse direction T in FIG. 2) are provided on either side of the windshield wiper 2, between the internal lateral wings of the guide clip 9 and the back of the main bracket 6 of the blade. The guide clip 9 thus enables the amplitude of the transverse relative movement of the windshield wiper 2 over the glazed surface to be limited to a few millimeters (vertical pivoting movement of the windshield wiper relative to the actuator arm is allowed).

In this first embodiment, the sprayer 4 is fastened to the guide clip 9.

As may be seen better in FIG. 3, the sprayer 4 and the guide clip 9 include a one-piece moulded plastic material body produced in two parts joined together on a joint plane P which here is substantially a longitudinal median vertical plane.

The moulded body thus includes a casing having a base 43, formed by the left-hand part (internal side) as seen in FIG. 3, and a complementary closure cap 44, on the right (external side). It is the base 43 that carries the guide clip 9 and the closure cap 44 that carries the connector 5, for example.

The casing is fastened to one end of a lateral wing of the guide clip 9 to offset the sprayer 4 vertically (see the vertical axis V in FIG. 2).

The casing of the sprayer 4 is essentially hollow and delimits an internal spray chamber into which the connector 5 opens and that includes a series of spray orifices 45 which here open into a curved lower wall portion, the orifices 45 preferably being formed by the moulding process in the joint plane P of the base 43 and/or in the face of the corresponding joint plane of the closure cap 44. The orifices 45 may also be produced mechanically or by laser.

The casing, and thus the internal spray chamber, is fed with washing liquid under pressure via the pressurized liquid feed pipe 3.

The pressurized liquid feed pipe 3 is of flexible material, for example elastomer material, and the downstream end section of the feed pipe 3 is designed to be nested externally around the connector 5 by elastic deformation of the material forming the pipe 3.

The internal passage of the connector 5 constitutes an entry pipe into the interior of the hollow casing, notably to feed the spray chamber.

The base and the closure cap 43 and 44 of the hollow casing are connected by any appropriate means, for example by gluing or ultrasound welding, and they may be relatively positioned for example by positioning pins that may also be clipping pins. It may also be envisaged that the two parts of the casing are moulded in one piece and are connected together by a thinner intermediate portion forming an articulation hinge between the base and the closure cap 43, 44.

When the driver operates the pump, windshield washer liquid is fed into the liquid feed pipe 3 and then into the sprayer 4 via the connector 5 and leaves via the spray orifices 45 to be sprayed onto the glazed surface of the vehicle.

Accordingly, the sprayer fastened to the actuator arm remains in place on the latter when changing the windshield wiper, which greatly reduces the cost of the windshield wiper compared to a wiper on which the sprayer is mounted. Moreover, the sprayer device enables the glass to be washed more efficiently by moving the spray orifices as close as possible to the glazed surface.

In a different embodiment of the sprayer shown in FIG. 4, it is the base 43' of the casing that carries the connector 5 and the guide clip 9.

In another embodiment shown in FIGS. 5 and 6, apart from the fact that the base 43" of the casing carries the connector 5 and the guide clip 9, the complementary closure cap 44" (external side) is fastened to the actuator arm 1. The closure cap 44" then has a specific shape aligned longitudinally with the bracket of the actuator arm 1 (FIG. 6). In this embodiment, the guide clip 9 is not fastened to the actuator arm 1, and the sprayer 4" is fastened to the actuator arm 1 by the casing closure cap 44".

The closure cap 44" and the longitudinal bracket are for example connected nesting fashion.

In another embodiment, not shown, the feed pipe includes two flow passages and the wiper device includes two sprayers, fastened to a respective guide clip, each flow passage being inserted in a connector of the respective sprayer. It is thus possible to dispense the windshield washer liquid over the glazed surface of each side of the actuator arm 1 by sending it only to the front portion of the blade, i.e. the side on which the actuator arm 1 advances during an upward sweep phase and the other side during the downward sweep phase. This arrangement enables instant wiping of the windshield washer liquid after it is deposited on the glazed surface, thus eliminating any interval during which vision may have been impaired.

The embodiments described may also be suitable for "flat blades" having no articulated structure with wiper arms. In this case, the windshield wiper includes a wiper blade, at least one flexible vertebra and integrated or non-integrated deflector having a particular aerodynamic shape enabling it to fulfil a spoiler function. The assembly comprising the deflector, the flexible vertebra and the support mount and the wiper blade is held together by end clip means of the windshield wiper and in this case the guide clip bears on the end clip means (not shown).

A second embodiment of a wiper device is shown in FIGS. 7 to 9. Only elements different from the first embodiment will be described hereinafter.

The wiper device includes an actuator arm 10 connected to a windshield wiper 12, a liquid feed pipe 3 carried by the actuator arm 10, and at least one sprayer 40 including a plurality of spray orifices and a connector 5 designed to be inserted into the liquid feed pipe 3.

The actuator arm 10, which is represented in the disassembled state in FIG. 8 to show it more clearly, includes a longitudinal bracket (or casing) 10a, a drive embellisher 10b, a support mount 10c and a casing embellisher 10d.

The support mount 10c has a particular aerodynamic shape enabling it to fulfil a spoiler function aimed at improving the adhesion of the windshield wiper 12 to the glazed surface.

The drive embellisher 10b, the support mount 10c and the casing embellisher 10d are fastened to the longitudinal bracket 10a.

These may be separate elements that nest elastically, for example. To be more precise, the casing embellisher 10d for example nests by elastic deformation in the hollow shape of the longitudinal bracket 10a to "close" the bottom cavity thereof. The casing embellisher 10d thus enables unwanted noise that may be generated by the airflow to be limited. It also enables the aesthetics of the actuator arm 10 to be improved and aerodynamic performance to be improved by forming a particular spoiler shape aimed at improving the pressing of the actuator arm against the glazed surface.

The casing embellisher 10d may also carry a guide clip 10e. The guide clip 10e is for example an element separate from the casing embellisher 10d and fixed thereto by any appropriate means. As will emerge hereinafter, the casing embellisher 10d is fastened to the longitudinal bracket 10a by elastic nesting of the guide clip 10e in the longitudinal bracket 10a.

The second embodiment differs from the first mainly in that in this second embodiment the sprayer 40 is fastened to the casing embellisher 10d (FIG. 9).

The sprayer 40 is stuck or ultrasonically welded to the casing embellisher 10d, for example.

To be more precise, in the embodiment shown, the sprayer 40 is fastened to the guide clip 10e of the casing embellisher 10d.

As may be seen in FIG. 10, the casing embellisher 10d and the longitudinal bracket 10a include complementary fixing means by elastic nesting. For example, the casing embellisher 10d is extended at a first end by the guide clip 10e which cooperates by elastic nesting with two complementary clipping lugs 13 carried by the longitudinal bracket 10a, substantially in the middle. Moreover, the casing embellisher 10d has at its second end a portion 14a conformed to cooperate with a complementary shape 14b of the longitudinal bracket 10a.

In another embodiment shown in FIG. 11, the casing embellisher 10d' is extended by a fixing tongue 15 forming a connecting area for fixing the sprayer 40.

In a further embodiment, not shown, the sprayer and the casing embellisher include complementary clipping type fixing means.

These last two embodiments are particularly suitable for a casing embellisher 10d" that has no guide clip (FIG. 12).

A third embodiment of a wiper device is shown in FIGS. 13a, 13b and 13c. Only elements different from the first embodiments will be described hereinafter.

As in the second embodiment, the actuator arm 60 includes a longitudinal bracket (or casing) 60a, a drive embellisher 60b and a support mount 60c that may form a deflector.

The support mount 60c is fastened to the longitudinal bracket 60a, for example by cooperation of complementary fixing means 51a, 51b carried by the support mount 60c and by the longitudinal bracket 60a, respectively, and by cooperation of a complementary part 51c of the support mount 60c.

The support mount 60c includes for example two guide brackets 52, 53 arranged longitudinally on the support mount 60c to cooperate with a mount of the windshield wiper 2.

In this third embodiment, the sprayer 50 is fastened to the support mount 60c of the actuator arm 60. For example, the sprayer 50 is fixed to the exterior of the guide bracket 52 of the support mount 60c, situated on the same side as the driver of the actuator arm 1.

At assembly time, the sprayer 50 is stuck or ultrasound welded to the support mount 60c, for example. The support mount 60c is then assembled to the longitudinal bracket 60a via the complementary fixing means 51a, 51b, 51c (see the arrow in FIG. 13). The windshield wiper 2 is then assembled to the support mount 60c (see arrows in FIG. 13b) and the connector of the sprayer 50 is inserted into the liquid feed pipe 3 carried by the actuator arm 60. The guide brackets then bear on the mount of the windshield wiper 2 and the sprayer 60 is then constrained to move with the windshield wiper 2 (FIG. 13a).

As specified above, the windshield wiper that may be assembled onto the actuator arm 60 and the support mount 60c may be a standard windshield wiper as shown or a flexible structure flat windshield wiper.

The invention claimed is:

1. A wiper device for a glazed surface of a motor vehicle, comprising:
   an actuator arm adapted to be connected to a windshield wiper;
   a liquid feed pipe carried by the actuator arm;
   at least one sprayer having at least one spray orifice; and
   a connector adapted to be inserted into the liquid feed pipe,
   wherein the at least one sprayer is fastened to the actuator arm such that a position of the at least one sprayer relative to the actuator arm is fixed,
   wherein the actuator arm includes a longitudinal bracket, a casing embellisher, and a support mount,
   wherein the at least one sprayer is directly fastened to the casing embellisher of the actuator arm, and
   wherein the casing embellisher is fastened to the longitudinal bracket.

2. The wiper device according to claim 1, wherein the at least one sprayer is fastened to a guide clip, the guide clip being fastened to a longitudinal bracket of the actuator arm.

3. The wiper device according to claim 2, wherein the at least one sprayer includes a casing fastened to one end of a lateral wing of the guide clip.

4. The wiper device according to claim 2, wherein the at least one sprayer includes a casing formed by a base and a complementary closure cap, the closure cap carrying the connector and the base carrying the guide clip.

5. The wiper device according to claim 4, wherein the sprayer and the guide clip include a moulded plastics material body produced in two parts joined together.

6. The wiper device according to claim 2, wherein, the sprayer includes a casing formed by a base and a complementary closing cap, the base carrying the connector and the guide clip.

7. The wiper device according to claim 1, wherein the sprayer is fastened to a guide clip, the at least one sprayer including a casing formed by a base and a complementary closure cap, the base carrying the connector and the guide clip and the closure cap being fastened to the actuator arm.

8. The wiper device according to claim 1, wherein the casing embellisher and the longitudinal bracket include complementary elastic nesting type fixing means.

9. The wiper device according to claim 8, wherein the at least one sprayer is fastened to a guide clip of the casing embellisher, wherein the guide clip and the casing embellisher comprise shapes cooperating with complementary shapes of the longitudinal bracket.

10. The wiper device according to claim 1, wherein:
the longitudinal bracket includes clipping lugs;
the casing embellisher includes a guide clip; and
the casing embellisher is fastened to the longitudinal bracket by elastic nesting of the guide clip of the casing embellisher in the clipping lugs of the longitudinal bracket.

11. The wiper device according to claim 10, wherein a shape of the casing embellisher is complementary with a shape of the longitudinal bracket and with a shape of the support mount.

12. A wiper device for a glazed surface of a motor vehicle, comprising:
an actuator arm adapted to be connected to a windshield wiper,
a liquid feed pipe carried by the actuator arm;
at least one sprayer having at least one spray orifice; and
a connector adapted to be inserted into the liquid feed pipe,
wherein the at least one sprayer is fastened to the actuator arm such that a position of the at least one sprayer relative to the actuator arm is fixed,
wherein the actuator arm includes a longitudinal bracket, a casing embellisher, and a support mount, and
wherein a shape of the support mount is a spoiler shape.

13. The wiper device according to claim 12, wherein the spoiler shape causes the actuator arm to press against the glazed surface during an operation of the motor vehicle.

\* \* \* \* \*